(12) United States Patent
Tokunaga et al.

(10) Patent No.: US 8,512,572 B1
(45) Date of Patent: Aug. 20, 2013

(54) METHOD OF PRECIPITATING URANIUM FROM AN AQUEOUS SOLUTION AND/OR SEDIMENT

(75) Inventors: Tetsu K. Tokunaga, Berkeley, CA (US); Yongman Kim, Walnut Creek, CA (US); Jiamin Wan, Berkeley, CA (US)

(73) Assignee: U.S. Department of Energy, Washington, DC (US)

( * ) Notice: Subject to any disclaimer, the term of this patent is extended or adjusted under 35 U.S.C. 154(b) by 509 days.

(21) Appl. No.: 12/764,077

(22) Filed: Apr. 20, 2010

(51) Int. Cl.
*B01D 21/01* (2006.01)
*C02F 1/52* (2006.01)
*C02F 1/68* (2006.01)
*G21F 9/14* (2006.01)
*G21F 9/20* (2006.01)

(52) U.S. Cl.
USPC ........... 210/724; 210/723; 210/749; 210/912; 588/18; 588/20

(58) Field of Classification Search
USPC ................ 210/719, 723, 724, 749, 757, 912; 588/18, 20; 423/12, 253
See application file for complete search history.

(56) References Cited

U.S. PATENT DOCUMENTS

| | | | | | |
|---|---|---|---|---|---|
| 2,789,879 | A | * | 4/1957 | Kaufman | 423/11 |
| 2,797,143 | A | * | 6/1957 | Arendale et al. | 423/5 |
| 2,979,378 | A | * | 4/1961 | Koble | 423/17 |
| 4,234,555 | A | * | 11/1980 | Pulley et al. | 423/484 |
| 4,438,077 | A | * | 3/1984 | Tsui | 423/7 |
| 5,275,739 | A | * | 1/1994 | Grant et al. | 405/128.5 |

* cited by examiner

*Primary Examiner* — Bobby Ramdhanie
*Assistant Examiner* — Nader Hossaini
(74) *Attorney, Agent, or Firm* — John D. Cravero; Brian J. Lally; John T. Lucas

(57) ABSTRACT

A method for precipitating uranium from an aqueous solution and/or sediment comprising uranium and/or vanadium is presented. The method includes precipitating uranium as a uranyl vanadate through mixing an aqueous solution and/or sediment comprising uranium and/or vanadium and a solution comprising a monovalent or divalent cation to form the corresponding cation uranyl vanadate precipitate. The method also provides a pathway for extraction of uranium and vanadium from an aqueous solution and/or sediment.

18 Claims, 9 Drawing Sheets

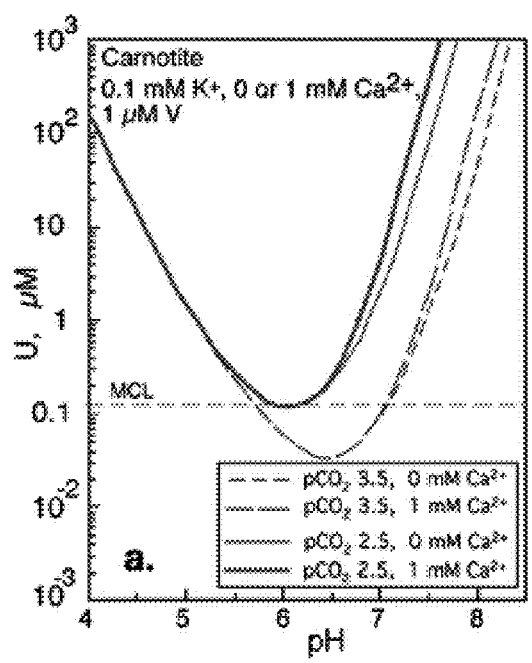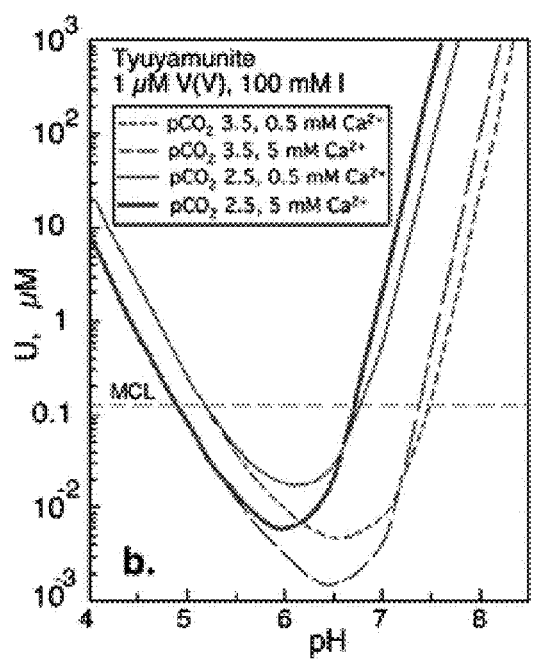
FIG. 1A FIG. 1B

METHOD OF PRECIPITATING URANIUM FROM AN AQUEOUS SOLUTION AND/OR SEDIMENT

GOVERNMENT INTERESTS

The United States Government has rights in this invention pursuant to Contract No. DE-AC02-05CH11231, between the U.S. Department of Energy (DOE) and University of California, Berkeley, representing the Lawrence Berkeley National Laboratory.

FIELD OF THE INVENTION

One or more embodiments of the present invention relates to a method of remediating uranium from a contaminated environment and, more specifically, to a method for precipitating uranium from an aqueous and/or sediment.

BACKGROUND

Uranium contamination in soil and water is of global concern and has been identified at a number of sites worldwide. Contamination may occur as a result of a variety of different activities, both natural and anthropogenic, including military testing, radiation accidents, nuclear fuel cycle activities (uranium mining, ore processing, fuel fabrication and reprocessing), electricity generation, mining and processing of other natural resources, and application of radionuclides in other industries.

In oxygen-containing groundwater, uranium is generally found in the hexavalent oxidation state. In waste, uranium is present primarily as soluble salts of the uranyl ion ($UO_2^{2+}$). The oxidized or hexavalent (VI) state of uranium is highly soluble and mobile, while the reduced or tetravalent (IV) state is relatively insoluble and, thus, immobile. As U(VI) is transported through groundwater, it can bond to minerals or carbonate and calcium species commonly found in groundwater. The latter scenario is problematic because the U(VI) remains highly mobile.

When reduced from the oxidation state, U(VI), to a lower oxidation state, such as U(IV), the solubility of uranium decreases and it becomes immobilized. In contrast to U(VI), U(IV) does not form soluble solids even in the presence of calcium and carbonate.

As U(VI) is transported through groundwater, it can bond to surfaces of minerals, a process which may retard its transport. It has recently been shown, however, that U(VI) also bonds strongly to the common groundwater species carbonate and calcium to form stable dissolved ternary complexes, which can effectively compete with mineral surfaces as "reservoirs" for U(VI). As a consequence, significant amounts of U(VI) remain in groundwater, thus maintaining relatively high mobility for U(VI), a highly undesirable scenario. Conversely, the tetravalent oxidation state, U(IV), forms sparingly soluble solids, even in the presence of dissolved carbonate and calcium, and thus tends to be relatively immobile.

Various strategies for remediation of uranium from groundwater and soil have been proposed in order to reduce the detrimental effects of uranium contamination on ecosystems and local communities. These methods are sometimes able to reduce uranium concentrations below regulatory limits [the U.S. EPA Maximum Contaminant Level (MCL) for U is 0.13 µM]. These strategies include physical, chemical and biological technologies. For example, iron barriers, soluble reductive agents, microbial stabilization via reduction and precipitation, and emplacement of solid phosphate barriers have been pursued as potential technologies to remediate uranium from a contaminated environment.

Currently, one of the most researched methods of uranium remediation is microbial mediated reduction of soluble uranyl species. This technique typically relies on injection of organic carbon into the contaminated environment to stimulate microbial U(VI) reduction to U(IV) solids. Under reducing conditions, microbial bioreduction produces elevated concentrations of bicarbonate and organic ligands from microbial utilization of organic carbon which promotes higher aqueous U(VI) concentrations. Consequently, organic carbon concentrations must be kept at concentrations high enough to maintain reducing conditions, but low enough to limit the formation of aqueous U(VI) carbonates. In addition, reducing conditions in the contaminated environment must be maintained due to the fact that U dissolves upon a return to the original oxidizing conditions of the subsurface environment. Another proposed remediation method is precipitation of uranium with phosphate in contaminated sediments. Phosphate reacts with U(VI) to form aqueous and ternary surface U(VI) complexes, poorly soluble uranyl phosphate precipitates, and U(VI) adsorbing phosphate minerals.

BRIEF DESCRIPTION OF THE DRAWINGS

Certain features, aspects, and advantages of the multiple embodiments of the present invention will become better understood with reference to the following description, appended claims, and accompanied drawings where:

FIG. 1 represents theoretical uranium concentrations at $pCO_2$=3.5 and 2.5, 1 µM V(V), and I=100 mM, for equilibrium with (a) carnotite (0.1 mM $K^+$; 0 and 1 mM $Ca^{2+}$), and (b) tyuyamunite (0.5 and 5.0 mM $Ca^{2+}$).

DETAILED DESCRIPTION

Figure 2:
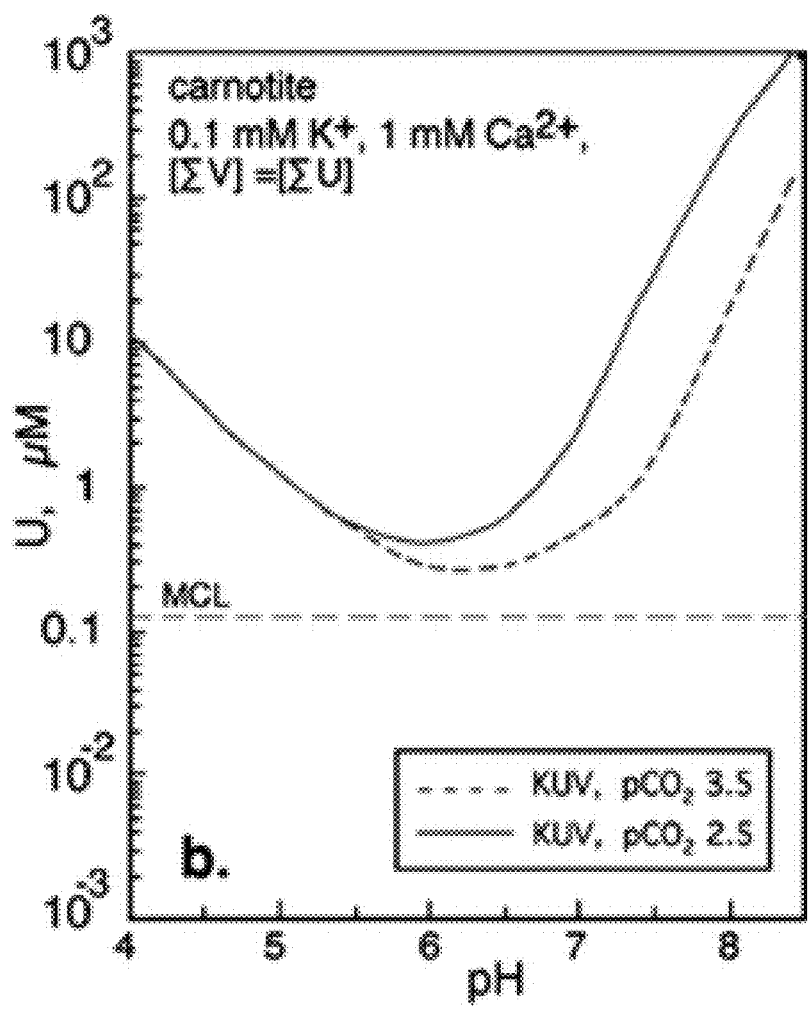
FIG. 2 represents the theoretical pH dependence of U and V concentrations when both elements are derived solely from mineral dissolution of carnotite (KUV), with $K^+$=0.1 mM, $Ca^{2+}$=1 mM, and I=100 mM.

Generally, one or more embodiments of the present invention relates to a method of precipitating uranium from an aqueous solution and/or sediment in the form of a precipitate. The embodiments are particularly useful for remediating uranium from contaminated aqueous environments found at a number of Department of Energy and other sites throughout the world.

One or more embodiments of the present invention may be generally described as precipitating uranium in the form of a low solubility precipitate comprising uranium. In one or more embodiments, the precipitate is a uranyl vanadate. More specifically, the precipitate may comprise compounds elementally similar to carnotite or tyuyamunite. The precipitation stabilizes uranium as a solid in oxidizing conditions and, thus, eliminates the need for constant observation and maintenance of specific biogeochemical conditions in a remediated area in order to maintain conditions in which uranium remains as a solid. Because this approach does not rely on maintaining reducing conditions, the need for an indefinite supply of electron donor is circumvented. Consequently, uranium availability will remain controlled even after biogeochemical conditions return to that of the regional environment.

As described above, one or more embodiments of the present invention relate to precipitation of uranium from an aqueous solution and/or sediment through precipitation of uranium. In one embodiment, the uranium precipitate comprises a uranyl vanadate. A uranyl vanadate is a compound comprising a uranium ion in its +6 oxidation state, e.g., $(UO_2)^{2+}$, and an oxoanion of vanadium generally in its highest oxidation state of +5. Precipitation of a low solubility uranyl vanadate is effective for controlling aqueous U concentrations in contaminated water and sediments due to the very low solubility observed in carnotite $[K_2(UO_2)_2V_2O_8]$ and tyuyamunite $[Ca(UO_2)_2V_2O_8]$ in some oxidized U ore deposits.

Vanadium is present in groundwater and sediments at varying levels primarily as the V(V) species, but also occurs in the III and IV oxidation states. Typical soils and sediments contain V at concentrations ranging from about 3 to 300 mg/kg. In groundwater, V is reported to be present at median and maximum concentrations of 1.4 µg/L (0.03 µM) and 190 µg/L (3.7 µM), respectively. While no MCL has been established for V, it is on the EPA Contaminant Candidate List. Subsurface transport of V(V) is controlled by sorption onto Fe oxides, thereby also moderating aqueous V(V) concentrations in the subsurface environment. Vanadate is typically present in groundwater as the oxyanion $H_2VO_4^-$ over the pH range between about 3.8 and 8.0. Remediation of uranium contaminated subsurface environments through precipitation of uranyl vanadate with $K^+$ or $Ca^{2+}$ under conditions representative of near-surface groundwater has not been attempted.

One or more embodiments of the present invention relate to a method of precipitating uranium from an aqueous solution, comprising the step of: mixing a solution comprising a monovalent or divalent cation with an aqueous solution comprising uranium and vanadium creating a mixed solution, wherein a precipitate is formed in the mixed solution. In one or more embodiments, the precipitate comprises a uranyl vanadate. Another embodiment comprises the further step of removing the precipitate from the mixed solution. One or more embodiments further include the step of adjusting the pH of the mixed solution to a pH between about 4.5 and 8.5, preferably between about 5.5 and 6.5.

In another embodiment of the present invention, the aqueous solution comprising uranium and vanadium is mixed with a solution comprising a monovalent cation selected from the group consisting of potassium, lithium, rubidium and cesium. In yet another embodiment, the pH of the mixed solution comprising a monovalent cation is adjusted to a pH between about 4.5 and 8.5, preferably between about 5.5 and 6.5. In one or more preferred embodiments the aqueous solution is mixed with a solution comprising potassium, and preferably potassium vanadate.

In another embodiment of the present invention, the aqueous solution containing uranium and vanadium is mixed with a solution comprising a divalent cation selected from the group consisting of calcium, strontium and barium. In yet another embodiment, the pH of the mixed solution comprising a divalent cation adjusted to a pH between about 4.5 and 8.5, preferably between about 5.5 and 6.5. In one or more preferred embodiments, the aqueous solution is mixed with a solution comprising the divalent cation calcium. In one preferred embodiment, the solution comprising calcium is a calcium sulfate, specifically calcium sulfate dehydrate.

Yet another embodiment further comprises the step of mixing a second solution comprising vanadium with the aqueous solution comprising uranium prior to precipitation wherein the ratio of the concentration of vanadium to uranium in the aqueous solution is less than or equal to about 1:1. In one or more embodiments, the solution comprises a monovalent cation selected from the group consisting of potassium, lithium, rubidium and cesium. In additional embodiments, the solution comprises a divalent cation selected from the group consisting of calcium, strontium and barium.

In one or more embodiments of the present invention, the method can be performed in situ or ex situ with respect to a subsurface environment. In situ precipitation of uranium from an aqueous solution or sediment involves the treatment in the contaminated environment, e.g., a subsurface environment having groundwater and sediment contaminated with uranium. On the other hand, ex situ treatment of an aqueous solution or sediment containing uranium is carried out aboveground or outside the original environment by physically extracting the impacted medium, e.g., aqueous solution or sediment. The medium can then be treated on-site and returned to the original environment or transported for treatment and disposal. In one or more embodiments of ex situ precipitation, the precipitate can be removed from the aqueous solution.

Additionally, one or more embodiments of the present invention can be used in conjunction with an in situ leaching (ISL) process. ISL works through a closed loop system in which oxygen and carbon dioxide, for example, are circulated in groundwater through wells in order to dissolve uranium from existing ore. The water containing the dissolved uranium is then transported to a treatment site where the uranium is extracted from the water. The one or more embodiments of the present invention could be useful in extracting uranium and other constituents of the ore than may be dissolved, such as vanadium, from the circulated water.

One or more embodiments also relate to a method of treating a sediment comprising uranium and vanadium, comprising: (a) providing a sediment comprising uranium and vanadium; and, (b) mixing said sediment with a solution comprising a monovalent or divalent cation, wherein a precipitate comprising uranium and vanadium is formed. In another embodiment, the method further comprises adjusting the pH of the sediment to between about pH 4.5 and 8.5, preferably between about 5.5 and 6.5. Additional embodiments include mixing the sediment with a solution comprising vanadium, wherein the ration of the concentration of vanadium to uranium in the sediment is less than or equal to about 1:1. In one or more embodiments, the monovalent cation is selected from the group consisting of lithium, potassium, rubidium and cesium. Yet another embodiment is directed to mixing a solution comprising potassium, as the monovalent cation, with the sediment. In multiple other embodiments, a solution comprising a divalent cation may be mixed with the sediment to precipitate a uranyl vanadate precipitate containing a divalent cation. In one or more embodiments, the divalent cation is selected from the group consisting of calcium, strontium and barium.

One or more embodiments of the present invention are directed to a method of extracting uranium and/or vanadium from an aqueous solution, comprising: (a) providing an aqueous solution comprising uranium and/or vanadium; (b) adjusting the pH of the aqueous solution to between about 4.5 and 8.5; (c) mixing the aqueous solution comprising uranium with a solution comprising vanadium; and, (d) mixing a solution comprising a monovalent or divalent cation with the aqueous solution and the solution comprising vanadium, wherein a precipitate comprising uranium is formed. In a preferred embodiment, the pH of the solution is between about 5.5 and 6.5. Another embodiment includes the further step of removing the precipitate from the solution. In one or more embodiments, the monovalent cation is selected from the group consisting of lithium, potassium, rubidium and cesium. Yet another embodiment is directed to mixing a solution comprising potassium, as the monovalent cation, with the solution comprising uranium. In multiple other embodiments, a solution comprising a divalent cation may be mixed with the aqueous solution comprising uranium to precipitate a uranyl vanadate precipitate containing a divalent cation. In one or more embodiments, the divalent cation is selected from the group consisting of calcium, strontium and barium. In a preferred embodiment, the divalent cation is calcium.

In yet another embodiment, a method of precipitating uranium is presented comprising the steps of: (a) measuring the uranium and vanadium concentration of an aqueous solution comprising uranium and/or vanadium; (b) mixing a solution comprising a monovalent or divalent cation with the aqueous solution comprising uranium and/or vanadium, wherein the ratio of the concentration of monovalent or divalent cation to uranium is greater than or equal to about 1:1; (c) mixing a solution comprising vanadium with the aqueous solution comprising uranium if no vanadium is detected in the aqueous solution in step (a) or if the amount of vanadium detected in the aqueous solution is less than the amount of uranium detected, wherein the ratio of the concentration of vanadium to uranium is greater than or equal to about 1:1; and, (d) adjusting the pH of the mixed solutions to between about pH 4.5 and 8.5, wherein a precipitate comprising uranium is formed. In another embodiment, the cation solution comprises the monovalent cation potassium, the ratio of the concentration of monovalent or divalent cation to uranium is greater than or equal to about 10:1, and the ratio of the concentration of vanadium to uranium is greater than or equal to about 10:1.

In yet another embodiment, the cation solution comprises the monovalent cation potassium, the pH of the mixed solution is between about 5.0 and 6.0, the ratio of the concentration of potassium to uranium is greater than or equal to about 25:1, and the ratio of the concentration of vanadium to uranium is greater than or equal to about 5:1.

In one preferred embodiment, the cation solution comprises the monovalent cation potassium, the pH of the mixed solution is between about 7.8 and 8.1, the ratio of the concentration of potassium to uranium is greater than or equal to about 100:1, and the ratio of the concentration of vanadium to uranium is greater than or equal to about 10:1. In another preferred embodiment, the cation solution comprises the divalent cation calcium, the pH of the mixed solution is between about 6.0 and 6.5, the ratio of the concentration of calcium to uranium is greater than or equal to about 10:1, and the ratio of the concentration of vanadium to uranium is greater than or equal to about 1:1.

Mixing Aqueous Solution Comprising U with Solution Comprising a Monovalent or Divalent Cation Generally, an aqueous solution comprising uranium and vanadium is mixed with a solution comprising a monovalent or divalent cation. The presence or absence and concentration of uranium and/or vanadium in an aqueous solution can be confirmed through testing methods known to one of skill in the art, including but not limited to chromatographic, spectroscopic and electrochemical methods that may be performed in situ or ex situ. More specifically, concentrations of uranium and/or vanadium may be determined using inductively coupled plasma mass spectrometry (ICP-MS) or atomic (optical) emission spectroscopy (ICP-AES or ICP-OES), in addition to kinetic phosphorescence analysis (KPA). In one or more embodiments, the aqueous solution comprising uranium and vanadium is groundwater.

In one or more embodiments, the solution comprising a monovalent or divalent cation can be a monovalent cation selected from the group consisting of potassium, rubidium, lithium and cesium. In one or more embodiments, the solution comprising a monovalent cation is a vanadate or chloride or sulfate salt of the monovalent cation. In one or more preferred embodiments, the monovalent cation is potassium. In one or more preferred embodiments, the solution comprising potassium is potassium vanadate, potassium chloride or a sulfate salt of potassium. While many solutions containing a monovalent cation are compatible, the preferred solution has a neutral to slightly acidic pH.

In one or more additional embodiments, the solution comprising a monovalent or divalent cation can be a divalent cation selected from the group consisting of calcium, strontium and barium. In one or more embodiments, the solution comprising a divalent cation is a vanadate or chloride or sulfate salt of the monovalent cation. In one or more preferred embodiments, the divalent cation is calcium. In yet another preferred embodiment, the solution comprising calcium is calcium chloride or a sulfate salt of calcium, such as calcium sulfate dihydrate. While many solutions containing a monovalent cation are compatible, the preferred solution has a neutral to slightly acidic pH.

In one or more embodiments of the present invention, the aqueous solution comprising uranium and vanadium may reside in a subsurface environment. The mixing of the aqueous solution and solution comprising a monovalent or divalent cation may occur in the subsurface environment, i.e., in situ. Methods of delivering solutions to a subsurface environment, i.e., in situ remediation, are known to one of skill in the art, including but not limited to the use of trenches, filter galleries, wells and injection ports to introduce the solutions into the subsurface.

In one or more embodiments, the aqueous solution comprising uranium and vanadium may be mixed with the solution comprising a monovalent or divalent cation outside the environment in which the aqueous solution typically resides, e.g., ex situ. In one such embodiment, an aqueous solution comprising uranium and vanadium is pumped out of a subsurface environment and mixed with a monovalent or divalent cation solution in order to form a uranyl vanadate precipitate. The precipitate can then be removed from the aqueous solution by filtration or other separation methods known to one of skill in the art, and as more fully described below. The uranium and vanadium-free aqueous solution may be subsequently pumped back into its original subsurface environment. Various methods used to carry out mixing in accordance with the present invention are known to one of skill in the art. Exemplary ex situ methods include but are not limited to excavation of uranium containing sediment or removal of uranium-containing aqueous solution and subsequent mixing performed via in-drum, in-plant or area mixing processes, which may be performed in mobile or fixed treatment plants, and in conjunction with in situ leaching processes.

Mixing Sediment Comprising U with Solution Comprising a Monovalent or Divalent Cation In one or more embodiments, the method relates to removing uranium and vanadium from sediment. The presence or absence and concentration of uranium and/or vanadium in an aqueous solution can be confirmed through testing methods known to one of skill in the art, including but not limited to ICP-MS, ICP-AES or KPA. The sediment can be any type of solid that contains uranium and/or vanadium. In one or more preferred embodiments, the sediment is from a subsurface environment.

In one or more embodiments, the solution comprising a monovalent or divalent cation are similar to those described above.

Also, as described above, one or more embodiments of the method can be carried out in a subsurface environment that includes sediment and/or groundwater comprising uranium and vanadium, i.e., in situ.

Alternatively, one or more embodiments of the present invention can be performed outside the original sediment environment, i.e., ex situ. For example, in one or more embodiments, sediment can be removed from a subsurface environment through methods known to one of skill in the art, e.g., excavation. The sediment comprising uranium and/or vanadium is then mixed with a solution comprising a monovalent or divalent cation ex situ in order to precipitate the uranium and vanadium. Subsequently, the uranium and vanadium precipitate may removed from the solution containing the sediment through filtration or other separation method. The uranium and vanadium-free sediment may be subsequently returned to its original environment.

Precipitation of Uranium

In one or more embodiments of the present invention, uranium and/or vanadium are precipitated out of a solution and/or sediment in order to remove the uranium and/or vanadium from the solution and/or sediment. In one or more preferred embodiments, the precipitate is a uranyl vanadate. A uranyl vanadate is a compound comprising a uranium ion in its +6 oxidation state, e.g., $(UO_2)^{2+}$, and an oxoanion of vanadium generally in its highest oxidation state of +5.

Precipitation of a uranyl vanadate may be accomplished through mixing an aqueous solution and/or sediment comprising uranium and/or vanadium with a solution comprising a monovalent and/or divalent cation at an appropriate pH level, as further described herein. Alternatively, an aqueous solution comprising uranium and/or vanadium may be mixed with a solution comprising vanadium and a solution comprising a monovalent or divalent cation where there is no vanadium present in the initial solution comprising uranium or where the amount of vanadium in the initial solution is not sufficient to precipitate enough uranium to lower it below the MCL.

In the case of a monovalent cation, one or more preferred embodiments use a solution comprising a cation selected from the group consisting of lithium, potassium, rubidium and cesium. The resulting precipitate is the corresponding lithium uranyl vanadate [$Li_2(UO_2)_2V_2O_8$], potassium uranyl vanadate [$K_2(UO_2)_2V_2O_8$], rubidium uranyl vanadate [$Rb_2(UO_2)_2V_2O_8$], or cesium uranyl vanadate [$Cs_2(UO_2)_2V_2O_8$], or substantially similar compounds. For example, a solution comprising uranium and vanadium may be mixed with a solution of potassium vanadate, potassium chloride, or any potassium solution having a slightly acidic to neutral pH, to form a precipitate, which may have a chemical formula substantially similar to $K_2(UO_2)_2V_2O_8$.

In the case of a divalent cation, one or more preferred embodiments use a solution comprising a cation selected from the group consisting of calcium, strontium and barium. The resulting precipitate is the corresponding calcium uranyl vanadate [$Ca(UO_2)_2V_2O_8$], strontium uranyl vanadate [$Sr(UO_2)_2V_2O_8$], or barium uranyl vanadate [$Ba(UO_2)_2V_2O_8$], or substantially similar compounds. For example, a solution comprising uranium and vanadium may be mixed a solution of calcium chloride, or any calcium solution having a slightly acidic to neutral pH, to form a precipitate, which may have a chemical formula substantially similar to $Ca(UO_2)_2V_2O_8$.

Adjusting the pH of the Mixed Solution

In one or more embodiments of the method, the pH of a mixed solution comprising an aqueous solution and/or sediment comprising uranium and vanadium and a solution comprising a monovalent or divalent cation is adjusted to be more acidic or more basic. In one or more embodiments, the pH of the mixed solution is between about 4.5 and 8.5, preferably between about 5.5 and 6.5. Generally speaking, in order to adjust to pH of the solution higher, i.e., more basic, a basic solution is added to the solution comprising an aqueous solution and/or sediment comprising uranium and vanadium. The amount of acidic or basic solution to be added to the mixed solution is dependent on the starting pH, the desired pH and the concentration and pH of the solution to be added, which can be determined through trial titration experiments, among other methods. Examples of compatible basic solutions that can be used to obtain this result are potassium hydroxide, calcium hydroxide or sodium bicarbonate. Conversely, the pH can be lowered through the addition of an appropriate amount of acidic solution. Examples of a compatible acidic solution that can be used to obtain this result are hydrochloric acid, nitric acid, HEPES buffer or MES buffer, although any number of acidic solutions may be used. In one or more preferred embodiments, the pH may be maintained between about 4.5 and 8.5, as described by the above methods, and preferably between about 5.5 and 6.5.

Addition of acidic or basic solutions in situ can be performed in the same manner as the addition of the monovalent or divalent cation containing solution discussed above. The amount of acidic or basic solution to be used in an in situ process will be determined on a case-by-case basis according to methods known to one of skill in the art depending on a number of factors, including the starting pH and geochemical characteristics of the environment. For an ex situ method, the acidic or basic solution can be added in any manner that will facilitate substantially uniform mixing of the acidic or basic solution with the uranium and/or vanadium containing solution and/or sediment, which will be determined by the manner and place in which ex situ treatment occurs.

Extracting/Mining U from an Aqueous Solution

In one or more embodiments of the method, uranium is removed from an aqueous solution by mixing a solution comprising vanadium and a second solution comprising a monovalent or divalent cation with the solution comprising uranium, wherein a precipitate is formed. Subsequently, or concurrently, the pH of the mixed solutions may be adjusted to between about 4.5 and 8.5, preferably between about 5.5 and 6.5, which may be accomplished through one of the above methods or by any method known to one of skill in the art. In a preferred embodiment, the solution comprising vanadium can be potassium metavanadate. Monovalent and divalent cations for use with one or more embodiments of the present invention are the same as those described above.

In one or more embodiments, the aqueous solution comprising uranium may be removed from a subsurface environment according to method known to one of skill in the art, including but not limited to the use of wells, pump systems and other extraction methods. After removal from the subsurface environment, the aqueous solution can be treated as described above. The precipitate can then be removed from the aqueous solution by filtration sedimentation, or other separation methods known to one of skill in the art.

Equilibrium Calculations

Uranium concentrations in equilibrium with carnotite and tyuyamunite were calculated using PHREEQC 2.12, a computer program designed to perform a wide variety of low-temperature aqueous geochemical calculations. Solutions were modeled with a range of K, Ca and V concentrations, in equilibrium with the atmosphere ($pCO_2$=3.5) and with a moderately elevated $pCO_2$=2.5 representative of slightly reducing pore waters. The majority of calculations were performed with representative groundwater concentrations of $Ca^{2+}$=1 mM and $K^+$=0.1 mM. Thermodynamic data was taken from the Nuclear Energy Agency compilation and other sources.

Calculations were performed for U concentrations with 1 μM vanadate in equilibrium with carnotite and tyuyamunite. Carnotite and tyuyamunite were able to control U concentrations below the MCL over a broad range of pH. Enhanced U solubility through formation of carbonate complexes is again evident from a comparison of the $pCO_2$ 3.5 and 2.5 curves in FIG. 1.

FIGS. 1A and 1B also demonstrate the effects of varying levels of $Ca^{2+}$ on dissolved U concentrations for equilibrium with carnotite and tyuyamunite. For example, FIGS. 1A and 1B show that increased $Ca^{2+}$ concentrations stabilize U at higher concentrations in the higher pH range through formation of strong Ca-U-carbonate complexes. Further, $Ca^{2+}$ drives U concentrations lower in tyuyamunite in high to intermediate pH ranges as Ca is a component of tyuyamunite. These effects on U(VI) complexation are predicted to maintain U concentrations above the MCL at pH>7.5, even in the presence of 1 μM V. Consequently, in alkaline systems, pH neutralization is a prerequisite for controlling U(VI) concentrations through precipitation of carnotite or tyuyamunite.

An important long-term condition to consider involving uranyl vanadate solid phases are those in which V concentration is not fixed at a single value, but instead is supplied by the dissolution of its uranyl minerals, carnotite and tyuyamunite. Such conditions might be present where carnotite or tyuyamunite naturally occur or are present as a result of remediation treatment, and subsequently begin to dissolve in groundwater with low V and U concentrations. The case for equilibrium U concentrations resulting from dissolution of carnotite in the reference groundwater (0.1 mM $K^+$, 1 mM $Ca^{2+}$, $pCO_2$ 3.5 and 2.5) as the sole source of V and U are shown in FIG. 2. This demonstrates that the U-MCL will be approached, but U concentrations will exceed the MCL in the reference groundwater when U and V are supplied only by carnotite dissolution. However, within the 5<pH<7 range, expected U concentrations exceed the MCL by less than 1 μM.

Figure 3A:
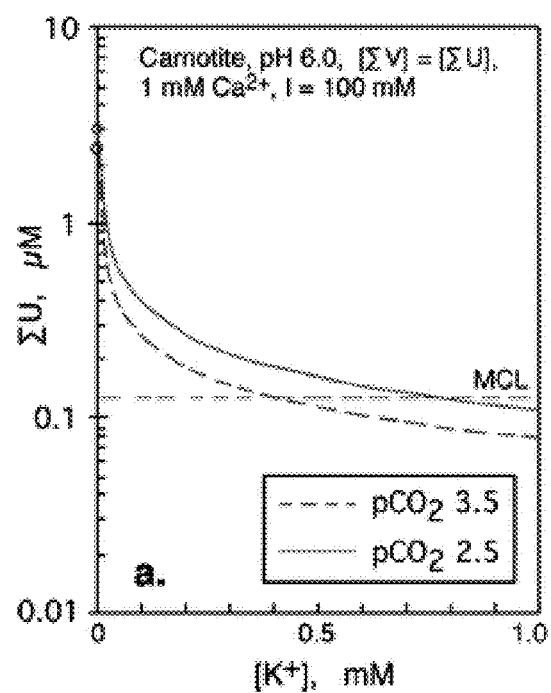
FIG. 3 represents the theoretical dependence of U concentrations on $K^+$ concentrations, for equilibrium with carnotite, with 1 mM $Ca^{2+}$, [ΣV]=[ΣU], for $pCO_2$=3.5 and 2.5, at (a) pH 6.0, and (b) pH 7.0.
Figure 3B:
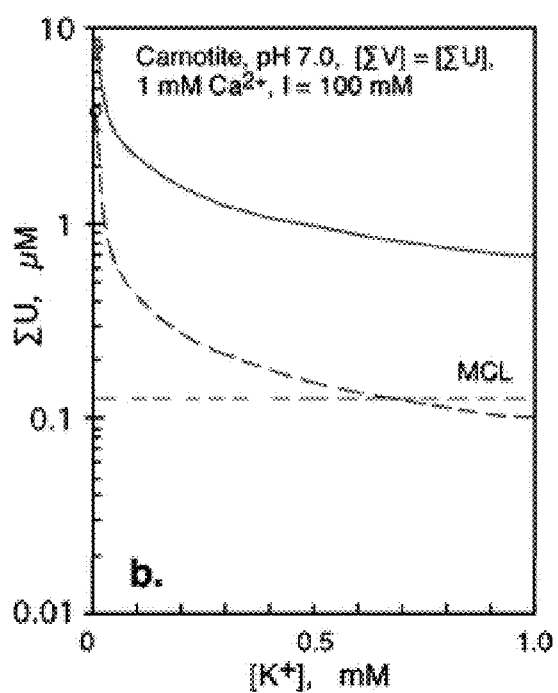

It is also important to test the effect of $K^+$ concentrations under conditions of equal U and V concentrations because, as a component of carnotite, elevated $K^+$ concentrations will suppress U concentrations. The influence of varying $K^+$ levels is presented in FIGS. 3A and 3B for the cases of pH=6.0 and 7.0, $Ca^{2+}$=1 mM, at $pCO_2$=3.5 and 2.5. As predicted, FIGS. 3A and 3B illustrate that the influence of carbonate and $Ca^{2+}$ are minor at pH=6.0 and major at pH=7.0. Thus, at sub-mM concentrations of $K^+$, carnotite can control U slightly below its MCL at a moderate $pCO_2$ of 2.5, but that significantly higher $K^+$ would be required at pH 7.0 and elevated $CO_2$.

Batch Experiments

Based on thermodynamic calculations, experiments involving the precipitation of carnotite were conducted at pH of 6.0 and 7.8. These two pH values were predicted to be near-optimal (lowest U concentration) and marginal (negligible U concentration change). Batch experiments were performed to determine the extent of homogenous U(VI) precipitation from solutions in response to additions of $K^+$ and V(V), in order to form $K_2(UO_2)_2V_2O_8$ or an elementally similar precipitate.

Uranyl nitrate (Spectrum Chemical) was used to prepare stock U(VI) solutions. Among commonly available vanadate compounds, potassium metavanadate, $KVO_3$ (Aldrich), was selected because it required little pH adjustment for the tested range, and it includes K. Upon dissolution in water at dilute concentrations, dissociated $VO_3^-$ converts to $H_2VO_4^-$. Samples were prepared in duplicate 40 mL batches in screw cap Teflon vials, to contain ~1 μM U, with $K^+$ concentrations of 0.1, 0.19, 1.0, and 10 mM, V(V) concentrations from 0 to 500 μM, and $NaNO_3$ added to set the ionic strength equal to 100 mM. Inclusion of nitrate also ensured that solutions remained oxidizing.

The pH values of 6.0 and 7.8 were established using 1 mM 2-(N-morpholino)ethanesulfonic acid (MES) buffer and 1 mM $NaHCO_3$, respectively. Subsequent measurements indicated that the solutions remained within ±0.1 pH units throughout the experiments. Capped vials were continuously agitated on a reciprocating shaker (~1 cycle $s^{-1}$) maintained at room temperature (20±1° C.), and sampled at prescribed times from 1 day up to 50 days. At sampling times, vials were temporarily opened to withdraw 1 mL samples, which were then centrifuged (14000 relative centrifugal force for 60 min). Supernatant solutions were withdrawn after centrifugation for U analysis by kinetic phosphorescence analysis (KPA, Chemchek), and K and V analysis by ICP-OES. In all of these batch experiments, the KPA detection limit was 0.2 nM.

The one or more embodiments of the present invention may be performed in situ or ex situ, depending on a number of considerations, including cost, efficiency, and the composition of the subsurface environment, among other considerations. Examples of in situ and ex situ remediation techniques compatible with the one or more embodiments of the present invention are generally described above.

Example 1

Figure 4A:
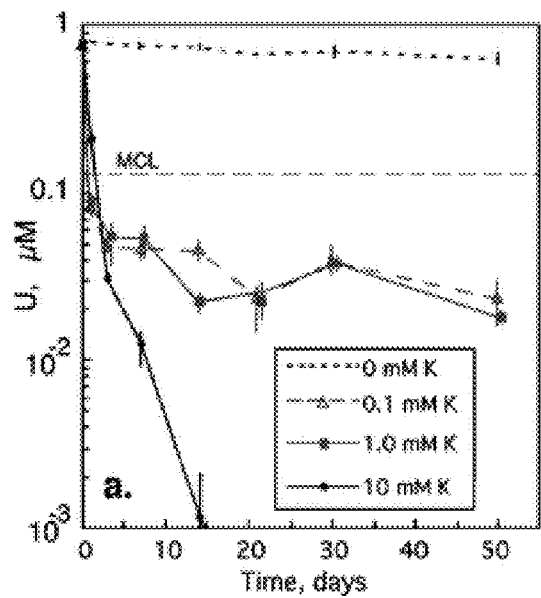
FIG. 4 represents time trends in U concentrations measured in pH 6.0, $pCO_2$ ~3.5 solutions with $K^+$ varied from 0 to 10 mM, and V(V) concentrations of (a) 5 µM and (b) 50 µM.
Figure 4B:
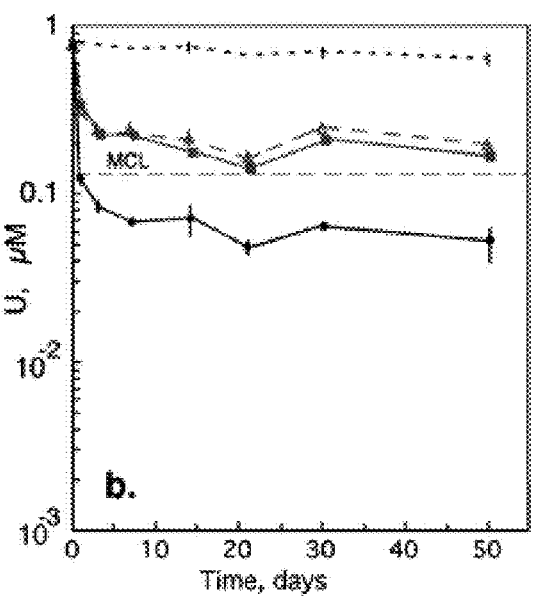

Homogenous precipitation of U(VI) in aqueous solutions was measured and exhibited complex dependence in various $K^+$ and V(V) concentrations. Time trends for the influence of $K^+$ concentrations on U(VI) precipitation at pH 6.0 and $pCO_2$ ~3.5 are shown for V concentrations of 5 and 50 μM in FIGS. 4A and 4B, respectively. For experiments conducted at pH 6.0, U concentrations decreased from 0.78 μM to 0.89 μM to below the MCL (0.13 μM) almost immediately in most cases. However, experiments with 50 μM V were not able to reduce U concentrations below the MCL with the addition of 0.1 or 1.0 mM $K^+$, as depicted in FIG. 4B. Also, of note is that the test of 10 mM $K^+$ with 5 μM V lowered U concentrations below the detection limit within 21 days. At the lower levels of 0.1 and 1.0 mM $K^+$, rates of U removal were similar and controlled U concentrations below the MCL for the 50 day time period tested, as shown in FIG. 4A.

Based on this data, at a pH of about 6.0, a solution containing the monovalent cation potassium will effectively precipitate uranium from an aqueous solution when the ratio of the concentration of vanadium to uranium is about 5:1, the ratio of the concentration of potassium to uranium is greater than or equal to about 100:1 and the ratio of the concentration of potassium to vanadium is greater than or equal to about 20:1. Also, precipitation of uranium occurs where the ratio concentration of vanadium to uranium is greater than or equal to about 50:1 and the ratio of the concentration of potassium to uranium is greater than or equal to about 10000:1 and the ratio of the concentration of potassium to vanadium is greater than or equal to about 200:1.

Example 2

Figure 5A:
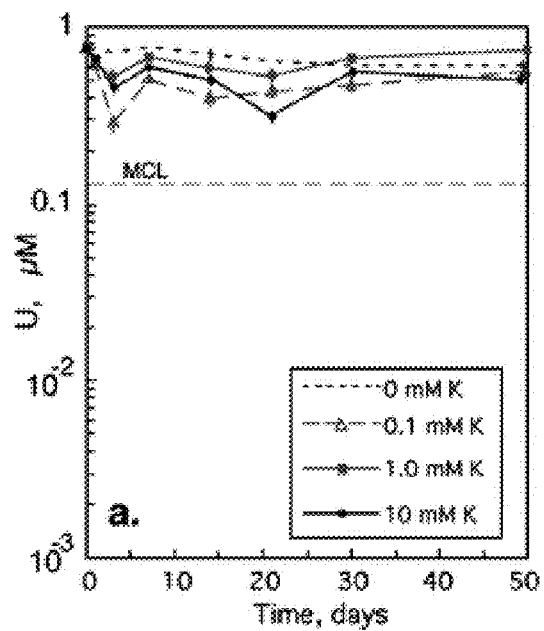
FIG. 5 represents time trends in U concentrations measured in pH 7.8, $PCO_2$ ~3.5 solutions with $K^+$ varied from 0 to 10 mM, and V(V) concentrations of (a) 5 µM and (b) 50 µM.
Figure 5B:
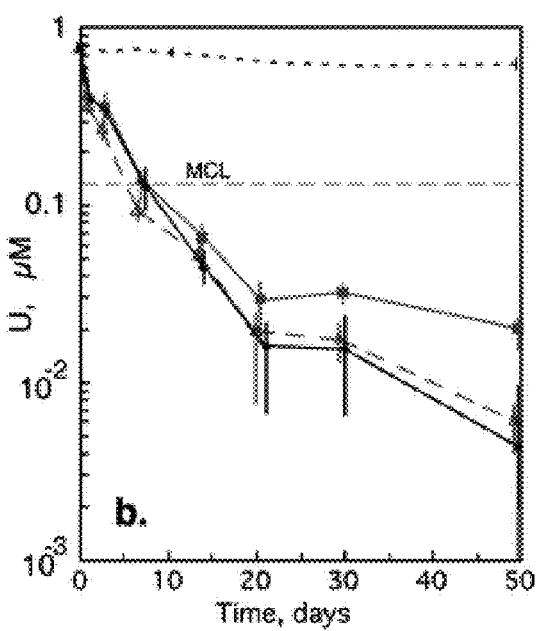

Time trends for the influence of $K^+$ concentrations on U(VI) precipitation at pH 7.8 and $pCO_2$ ~3.5 are shown for V concentrations of 5 and 50 μM in FIGS. 5A and 5B, respectively. At pH 7.8, 5 μM V(V) was insufficient to lower U concentrations below the MCL regardless of $K^+$ concentration, despite that equilibrium calculations predicted substantial carnotite precipitation. As depicted in FIG. 5B, U removal was effective with 50 μM V(V) with no variation in effectiveness in changes of $K^+$ concentration over 0.1 mM K.

Based on this data, at a pH of about 7.8, a solution containing the monovalent cation potassium will effectively precipitate uranium from an aqueous solution when the ratio of the concentration of vanadium to uranium is about 50:1, the ratio of the concentration of potassium to uranium is greater than or equal to about 100:1 and the ratio of the concentration of potassium to vanadium is greater than or equal to about 2:1. However, where the ratio of the concentration of vanadium to uranium was about 5:1, precipitation did not occur.

Example 3

Figure 6:
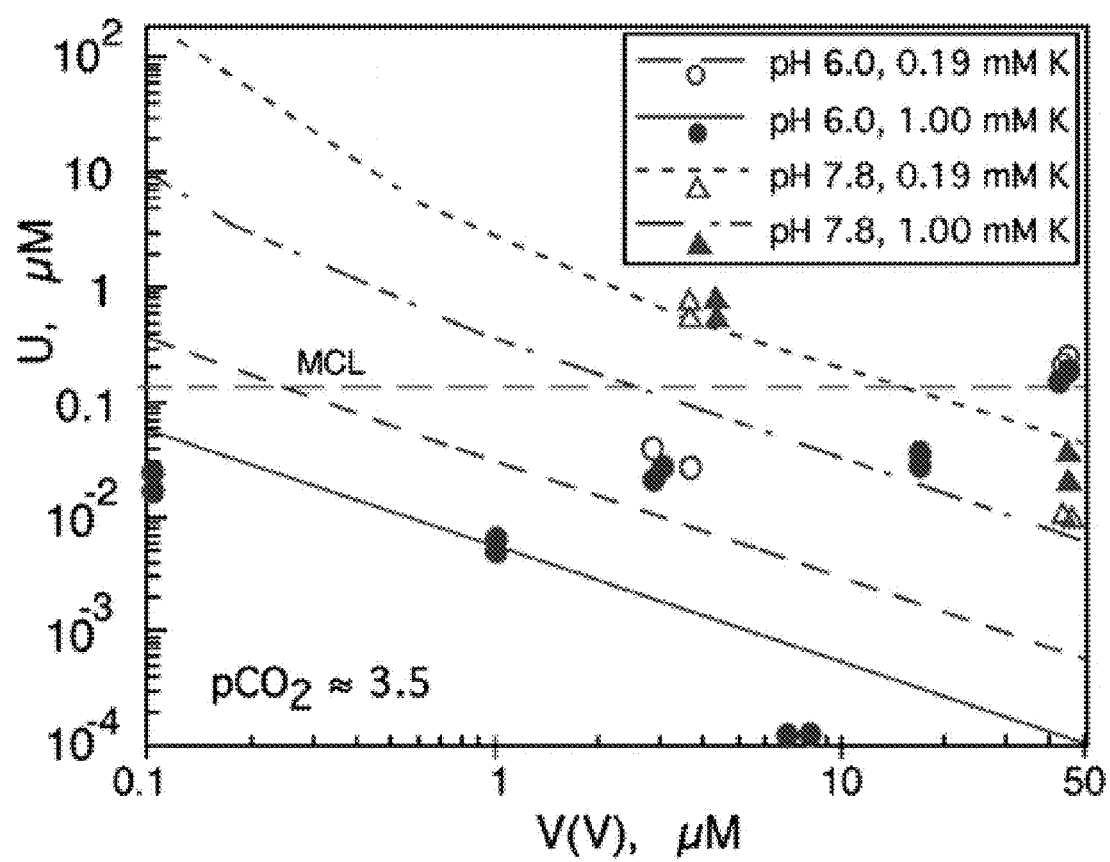
FIG. 6 is a comparison of predicted (curves) and measured dependence of U concentrations on V(V) concentrations at $pCO_2$=3.5, and $K^+$=0.19 and 1.0 mM, for equilibrium with carnotite (pH=6.0 and 7.8) after 50 days at equilibration.

Due to the rapid and similar removal of U at pH 6.0 with V(V)=5 μM at $K^+$ concentrations equal to 0.1 mM and 1.0 mM shown in FIG. 5A, additional measurements were performed with further variation of V around the lower concentration. These experiments yielded similarly rapid removal of U with the lowest final U concentrations being obtained using initial V(V) concentrations between 2 to 10 μM. Comparisons of the experiments conducted in Examples 1-3 with thermodynamic predictions are shown in FIG. 6. As shown, the extent of U removal after 50 days with higher initial V(V) concentration was less effective in tests conducted at pH 6.0. In addition, at pH 7.8, experiments with 5 μM V showed little variation with increased $K^+$, even with higher levels of $K^+$ where predictions from carnotite solubilities are expected to drive U concentrations below the MCL. For the pH 7.8 experiments conducted with 50 μM V, U concentrations dropped below the MCL with both 0.1 mM and 1.0 mM K.

Example 4

The composition of the U-containing solid phase was examined in a separate, 2 L batch solution. The precipitated solid was collected on 0.2 μm filters and analyzed by inductively coupled plasma optical emission spectrometry (ICP-OES) and X-ray diffraction (XRD). The ICP-OES analysis of the acid-digested precipitate yielded a K:U:V ratio of 1.24: 1.00:1.09, compared to an ideal ratio of 1:1:1 for carnotite. The solid phase was determined to be amorphous in the XRD measurement. Despite the lack of crystallinity in the precipitate, the similar K:U:V elemental ratios and the approximate agreement of measured aqueous U concentrations with thermodynamic predictions support precipitation of a carnotite-like phase.

Example 5

Batch experiments were also performed on U-contaminated sediments from Oak Ridge (pH 8.1) and Savannah River (pH 5.2). The sediments were spiked with U(VI)-nitrate to a final U concentration of 100 mg/kg, then treated in suspensions with V concentration ranging from 0.05 to 1.5 mM, and $K^+$ from 0.1 to 5 mM.

Figure 7:
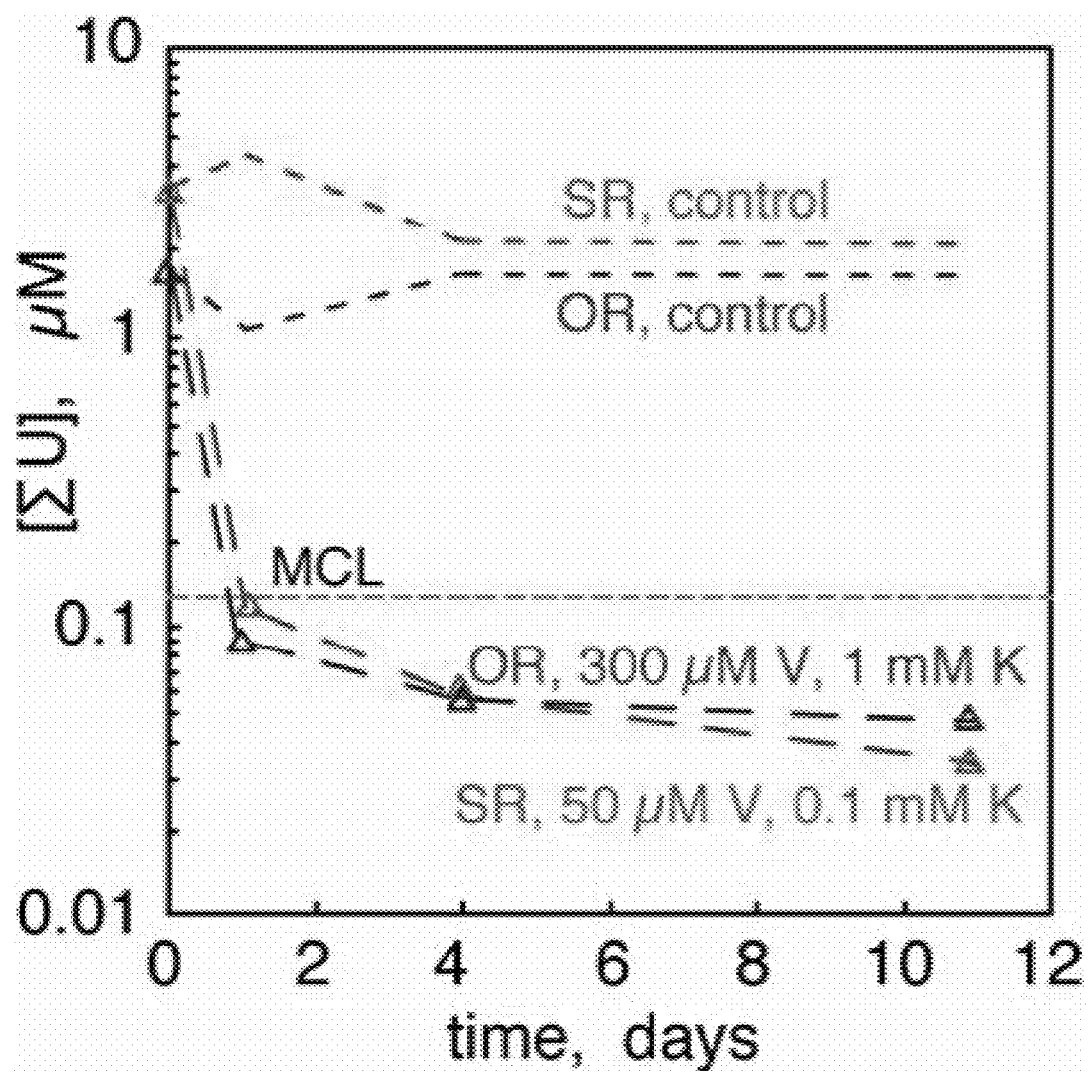
FIG. 7 represents time trends in U concentrations measured in Oak Ridge (pH 8.1) and Savannah River (pH 5.2) sediments treated with varying V and $K^+$ concentrations.

The Oak Ridge sediment had an initial aqueous U concentration of approximately 1.9 μM and was treated with 300 μM V and 1 mM $K^+$ and uranium levels were reduced to less than the MCL within one day. The Savannah River sample had an initial aqueous U concentration of approximately 2.1 μM and exhibited similar reduction of U(VI) concentrations within 1 day upon treatment with 50 μM V and 0.1 mM K. U(VI) concentrations were further reduced over the extended time period of the tests. Control suspensions (U-contaminated to 100 mg/kg, but not V addition) had aqueous phase U concentrations in the range of 1.0 to 4.5 μM. The results of these experiments are summarized in FIG. 7.

Figure 8:
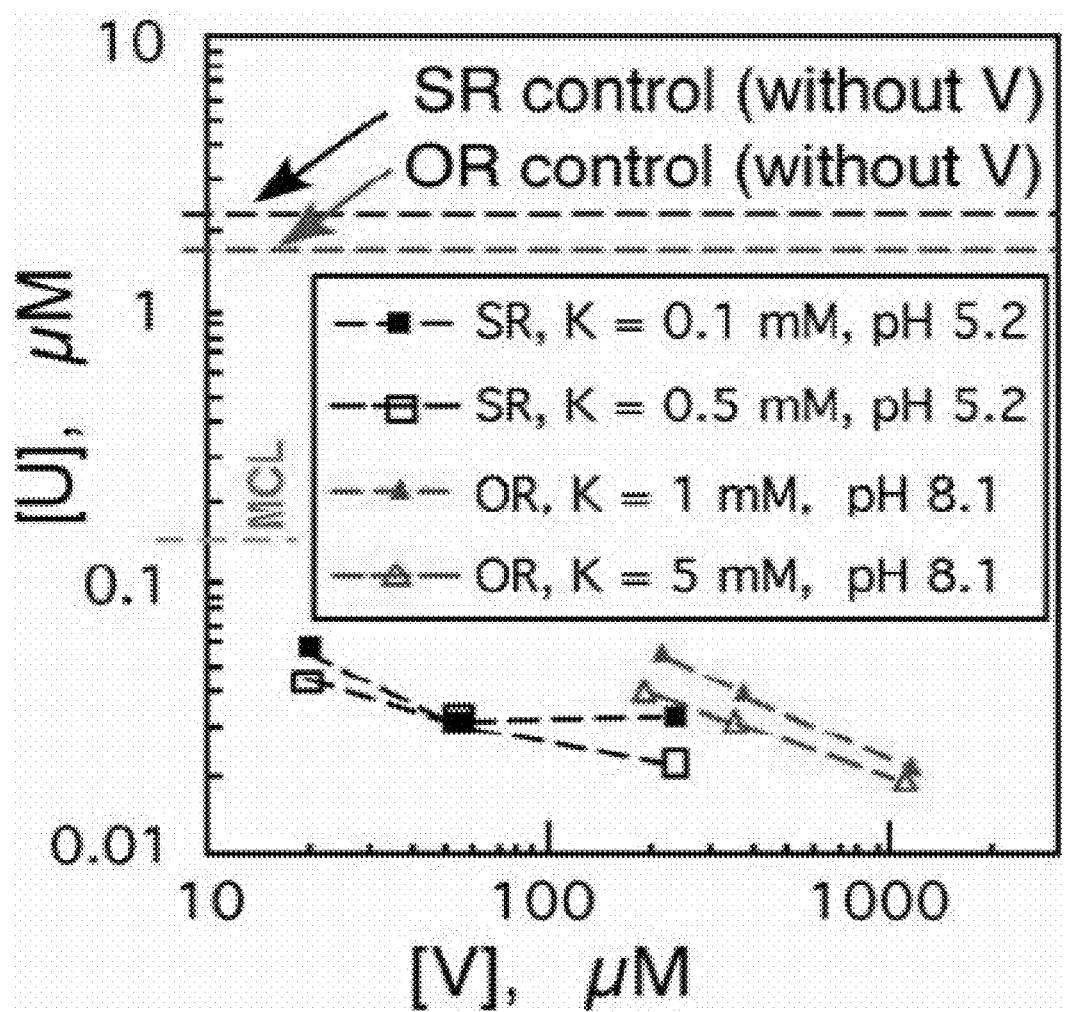
FIG. 8 depicts the U concentrations after 4 days measured in Oak Ridge (pH 8.1) and Savannah River (pH 5.2) sediments treated with varying V and $K^+$ concentrations.

The effect of V concentration on U(VI) removal was also examined at two $K^+$ concentrations for both the Oak Ridge and Savannah River sediments. Two separate Savannah River sample sediments (pH 5.2) were treated with 0.1 mM $K^+$ and 0.5 mM $K^+$, respectively, and V concentrations ranging from approximately 20 μM to 125 μM. Similarly, two separate Oak Ridge (pH 8.1) sample sediments were treated with 1 mM $K^+$ and 5 mM $K^+$, respectively, and V concentrations ranging from approximately 120 μM to 1 mM. The experiments with both sediments demonstrate that U(VI) removal is proportional to V concentration. The results of these experiments are summarized in FIG. 8.

Based on this data, at a pH of about 5.2, a solution containing the monovalent cation potassium will effectively precipitate uranium from sediment when the ratio of the concentration of vanadium to uranium is greater than or equal to about 10:1, the ratio of the concentration of potassium to uranium is greater than or equal to about 25:1 and the ratio of the concentration of potassium to vanadium is greater than or equal to about 1:2.5.

In addition, at a pH of about 8.1, a solution containing the monovalent cation potassium will effectively precipitate uranium from sediment when the ratio of the concentration of vanadium to uranium is greater than or equal to about 100:1, the ratio of the concentration of potassium to uranium is greater than or equal to about 500:1 and the ratio of the concentration of potassium to vanadium is greater than or equal to about 1:1.

Example 6

Figure 9:
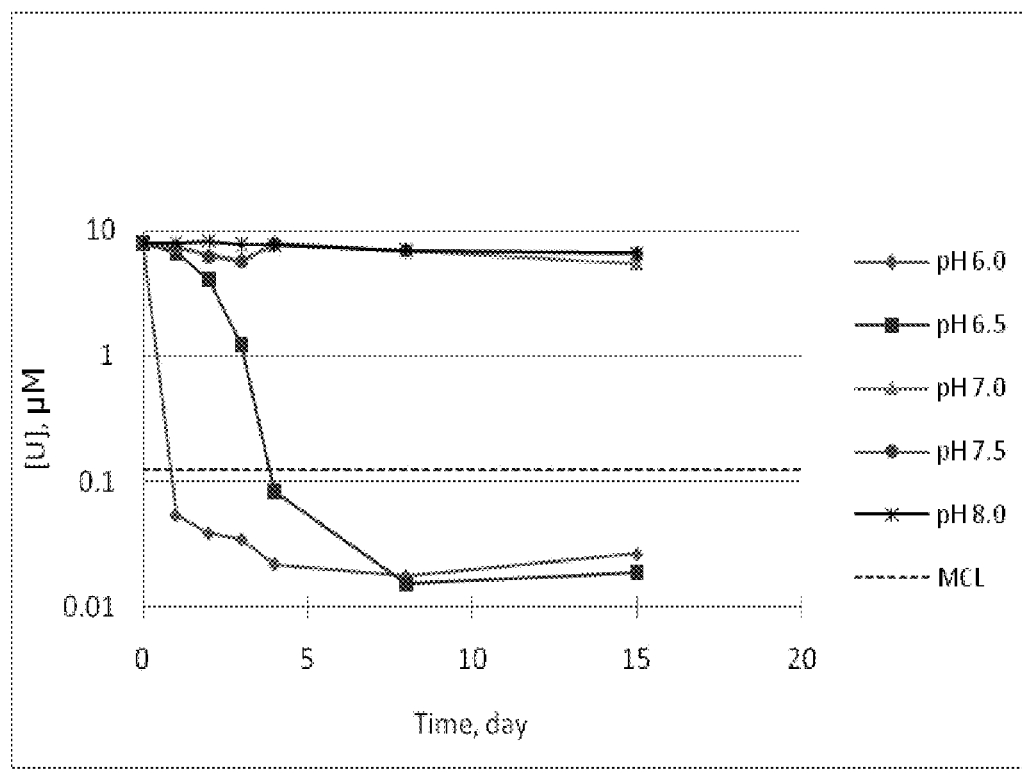
FIG. 9 represents time trends in U concentrations measured in various pH solutions with 3 mM $Ca^{2+}$ and V concentrations of 20 µM.

Laboratory experiments were conducted in order to test the effectiveness of precipitation of a calcium uranyl vanadate solid from aqueous solutions initially containing high levels of U. An initial stock solution was prepared containing components of the target precipitate at concentrations of 8 μM U(VI), 20 μM V(V), and 3 mM $Ca^{2+}$. Uranyl nitrate, sodium metavanadate, and calcium sulfate dihydrate were used as starting reagents. Other ions in solution were $Mg^{2+}$ (3 mM), $Na^+$ (5 mM), $SO_4^{2-}$ (6 mM), $Cl^-$ (1 mM), $NO_3^-$ (1 mM), initial $HCO_3^+$ (3 mM), and initial pH of 8.0. This stock solution was split into smaller Teflon vials, which were adjusted to different pH values (6.0, 6.5, 7.0, 7.5, and the unadjusted ≈8.0). The pH-adjusted vials were placed on a shaker for continuous agitation, with periodic sampling for analysis of the aqueous phase chemical composition. Nitric acid, HEPES buffer (1 mM), and MES buffer (1 mM) were used for pH adjustments. The presence of nitrate (1 mM) and periodic opening of the vials for pH adjustment ensured that all solutions remained oxidizing. Prior to chemical analyses, solutions were centrifuged to remove potentially suspended particles. Concentrations of U, V, and Ca were measured on days 1, 2, 3, 4, 8, and 15 by ICP-MS. Time trends of U concentrations at various pH values are depicted in FIG. 9.

Based on this data, between the pH of about 6.0 to 6.5, the divalent cation calcium will effectively remove uranium from an aqueous solution when the ratio of the concentration of calcium to uranium is greater than or equal to about 10:1 and the ratio of the concentration of vanadium to uranium is greater than or equal to about 1:1.

A number of the examples described above are also described in Tokunaga, T., et al., *Environ. Sci. Technol.*, 2009, 43, 5467-5471, which is incorporated by reference herein.

It is to be understood that the above-described examples are only illustrative of the application of the principles of the present invention and it is not intended to be exhaustive or limit the invention to the precise form disclosed. Numerous modifications and alternative arrangements will be apparent to those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

We claim:

1. A method of immobilizing uranium (VI) in a subsurface environment, comprising: adding a solution containing a monovalent or divalent cation and vanadium (V) to a subsurface environment contaminated with uranium (VI), wherein a precipitate comprising said uranium (VI) is formed in the subsurface environment.

2. The method of claim 1, further comprising the step of removing the precipitate from the subsurface environment.

3. The method of claim 1, wherein the precipitate comprises a uranyl vanadate.

4. The method of claim 1, further comprising the step of adjusting the pH of the subsurface environment to between about pH 5.5 and 6.5.

5. The method of claim 1, further comprising the step of removing the precipitate from the subsurface environment.

6. The method of claim 1, further comprising the step of adjusting the pH of the subsurface environment to between about pH 4.5 and 8.5.

7. The method of claim 6, wherein the cation solution comprises a monovalent cation selected from the group consisting of potassium, lithium, rubidium and cesium.

8. The method of claim 6, wherein the cation solution comprises the monovalent cation potassium.

9. The method of claim 8, wherein the pH of the subsurface environment is adjusted to between about 5.5 and 6.5.

10. The method of claim 8, wherein the pH of the subsurface environment is about 6, the ratio of the concentration of vanadium to uranium is greater than or equal to about 50:1, and the ratio of the concentration of potassium to uranium is greater than or equal to about 10000:1.

11. The method of claim 8, wherein the pH of the subsurface environment is about 8 and the ratio of vanadium concentration to uranium concentration is greater than 5:1.

12. The method of claim 6, wherein the cation solution comprises a divalent cation selected from the group consisting of calcium, strontium and barium.

13. The method of claim 6, wherein the cation solution comprises the divalent cation calcium.

14. The method of claim 13, wherein the pH of the subsurface environment is adjusted to between about 5.5 and 6.5.

15. The method of claim 6, wherein the subsurface environment is also contaminated with vanadium and wherein the ratio of the concentration of vanadium to uranium in the subsurface environment is less than or equal to about 1:1.

16. The method of claim 15, wherein the cation solution comprises a monovalent cation selected from the group consisting of potassium, lithium, rubidium and cesium.

17. The method of claim 15, wherein the cation solution comprises a divalent cation selected from the group consisting of calcium, strontium and barium.

18. A method of treating sediment contaminated with U(VI) and V(V) comprising:
   (a) providing a sediment comprising uranium and vanadium; and,
   (b) mixing said sediment with an aqueous solution comprising a monovalent or divalent cation, wherein a precipitate comprising uranyl vanadate is formed; and,
   (c) further comprising mixing the sediment with a solution comprising vanadium prior to mixing the solution comprising a monovalent or divalent cation, wherein the ratio of the concentration of vanadium to uranium in the sediment is less than or equal to about 1:1.

* * * * *